United States Patent [19]

Beardsley et al.

[11] Patent Number: 4,916,605
[45] Date of Patent: Apr. 10, 1990

[54] FAST WRITE OPERATIONS

[75] Inventors: Brent C. Beardsley, Tucson, Ariz.; Michael D. Canon; Malcolm C. Easton, both of San Jose, Calif.; Michael H. Hartung, Tucson, Ariz.; John H. Howard, San Jose, Calif.; Robert H. Vosacek, Tucson, Ariz.

[73] Assignee: International Business Machines Corporation, Armonk, N.Y.

[21] Appl. No.: 91,406

[22] Filed: Aug. 31, 1987

Related U.S. Application Data

[63] Continuation-in-part of Ser. No. 593,747, Mar. 27, 1984, abandoned.

[51] Int. Cl.[4] .................................................. G06F 13/00
[52] U.S. Cl. ...................................... 364/200; 364/239; 364/430; 364/260
[58] Field of Search ... 364/200 MS File, 900 MS File

[56] References Cited

U.S. PATENT DOCUMENTS

| | | | |
|---|---|---|---|
| 3,588,839 | 6/1971 | Belady et al. | 364/200 |
| 4,020,466 | 4/1977 | Cordi et al. | 364/200 |
| 4,523,206 | 6/1985 | Sasscer | 364/200 |
| 4,523,275 | 6/1985 | Swenson et al. | 364/200 |
| 4,530,055 | 7/1985 | Hamstra et al. | 364/200 |
| 4,598,357 | 7/1986 | Swenson et al. | 364/200 |
| 4,608,688 | 8/1986 | Hansen et al. | 364/200 X |
| 4,779,189 | 10/1988 | Legvold et al. | 364/200 |

OTHER PUBLICATIONS

C. E. Hoff et al., "Selective Journaling", IBM Technical Disclosure Bulletin, vol. 18, No. 1, Jun. 1975, pp. 61-62.

N. K. Ouchi et al., "Check Point Copy for a Two-Stage Store," IBM Technical Disclosure Bulktin, vol. 20, No. 5, Oct. 1977, pp. 1955-1958.

*Primary Examiner*—David L. Clark
*Assistant Examiner*—Michael A. Jaffe
*Attorney, Agent, or Firm*—Whitham & Marhoefer

[57] ABSTRACT

A technique is described for performing a fast write operation. A host write request, which would normally be serviced by an immediate physical write to a data storage device, is instead written to cache and nonvolatile storage in the data storage device controller. Then, the controller signals the host that the write operation is complete and does not update the physical data storage device until later. A journal log is also used to provide recovery capability in the event of system failure. This technique provides high performance for the units' operation while assuring integrity by keeping two copies of the write operation until the physical update transpires.

15 Claims, 8 Drawing Sheets

JOINT ARRAY STRUCTURE

FAST WRITE OPERATIONS

RELATED APPLICATIONS

This application is a continuation-in-part of application Ser. No. 593,747 filed Mar. 27, 1984, which is now abandoned.

BACKGROUND OF THE INVENTION

1. Field of the Invention

This invention generally relates to improvements in data storage devices for the input and output of information to a data processing system and, more particularly, to a fast write function for a data storage device. Generally, all data in write operations goes directly to data storage devices as well as cache in order to keep all data current on a nonvolatile media. Using the fast write method, the data may be transferred to a nonvolatile storage without a concurrent update of the data storage device. In the fast write mode, the data is written to the cache and the nonvolatile storage. The update of the actual data storage device transpires later. A status array is also employed to retain the status and device identification information on a status track of each of the data storage devices and another location to provide global identification and management of interchangeable data storage devices. A journal log is also used to provide recovery capability in the event of system failure.

2. Description of the Prior Art

The past several years have seen the growth of on-line workstations, the evolution of distributed processing, and the acceleration of information technology in many new application areas. The result has been an increase in the rate of access and the use of on-line database systems and a growth in the requirement for storage capacity and increased reliability and flexibility in data storage devices.

To satisfy the performance demands of on-line systems, the main memory of a central processing unit (CPU) and the data storage devices (DASD) are supplemented with a directorymanaged, high speed buffer storage that is continually updated to contain recently accessed contents of the main memory of the CPU. The purpose of the cache is to reduce the access time associated with obtaining information from slower speed DASD by having the information in the high speed cache.

The performance of a cache is characterized by hit/miss ratios. A hit occurs when a READ request from the CPU finds the requested data in cache as contrasted with a miss which means the data is not in cache and must be read from DASD. A hit with respect to a WRITE request from the CPU occurs when the information can be written into a free location in the cache for later transfer to the DASD. If there is no additional space available in the cache then a WRITE miss occurs and data must be written to DASD in order to accommodate the new information.

The process of writing information from cache to DASD is called destaging, and the process of reading information from DASD to cache is called staging. Data destaged or staged between the cache and the DASD is managed by algorithms designed to keep the data most likely to be referenced next by the CPU in the cache. Two of the more popular algorithms that are used for this management are the least recently used (LRU) and most recently used (MRU) algorithms. The LRU algorithm is used to determine which information in cache has been used the least and is a good candidate for destaging. The MRU algorithm is used to determine the information that is used the most and is a good candidate to be staged.

One of the problems with the staged storage system described above is that changes that are written to the cache are not written immediately to DASD. A problem arises if a failure occurs between the cache and the DASD. This means that updates that reside in the cache cannot be posted to the DASD. The prior art has approached this integrity problem in various ways exemplified by Hoff, "Selective Journaling", IBM Technical Disclosure Bulletin, Vol. 18, pp. 61-2, June 1975; and Baird and Ouchi, "Synchronous Pair Block Recording", IBM Technical Disclosure Bulletin, Vol. 25, pp. 2053-6.

Baird's staged storage protection method produces an endless history file such as that required for auditing. The method employs an active file and a history file. The history file is updated each time a write is made to the active file to track the changes that are made. The disadvantage of this approach is that CPU processing is delayed until the actual write to the active and history file is accomplished on DASD. Hoff describes a journaling technique that tracks critical data files and keeps a duplicate copy of these files. The technique destages the journal information to tape at regular intervals to allow the journal area to be reused.

Another approach to assuring the integrity of information in staged storage systems is disclosed in U.S. Pat. No. 4,084,231 to Capozzi, which provides a hierarchal memory system consisting of multiple levels. The highest level is the CPU's main memory, and the lowest level is a tape unit for tracking changes to the memory system. A least recently first modified (LRFM) algorithm is employed to destage the information that has been in memory for the longest amount of time. This is in sharp contrast to the more efficient LRU algorithm that destages the information that has been least used by the CPU. One of the drawbacks to this system is the flat file nature of the journals. The journals have no capability to be reused unless the complete journal is archived to a medium such as tape. This means that frequent archiving must transpire or else a large amount of storage must be dedicated to the journal.

An additional approach to assuring the integrity of information in staged storage systems is disclosed in U.S. Pat. No. 4,507,751 to Gawlick, which teaches a journaling technique for a staged storage system which utilizes a buffer and a journal stored on a nonvolatile medium Gawlick's journaling method uses a first-in-first-out (FIFO) stack approach to updates. This updating approach allows the use of a finite journal; however, it does not provide the necessary support for a random update cache journal.

A final approach to assuring the integrity of information in staged storage systems is disclosed in U.S. Pat. No. 4,077,059 to Cordi et al. Cordi discloses a hierarchal memory system comprising multiple levels. Each level has a data store, a copy back store and a journal. When data changes are made at a memory hierarchy level, they are recorded in both the data store and the copy back store of that memory hierarchy level, and a corresponding entry is made in the journal to track the update. The data changes are copied from the copy store to the data store of the next lower level in the memory hierarchy at the appropriate times using an LRU algorithm. The journal entries are made in sequential locations of the journal in a FIFO fashion. The journal of a hierarchy is used to control the order that the changes are to be copied to the lower level in the memory hierarchy. The journal is not used for backup purposes to protect the integrity of the information.

The concepts of self-test, redundancy, cross-check verification between various sources of information and the like are also well known in the art. Particularly, with the advent of complex digital computer systems used for applications such as process control or supervisory control. An example of such a system is illustrated in U.S. Pat. No. 4,032,757 to Eccles, which uses a pair of channels to continually compare the events occurring in each computer. The constant comparison allows the additional processor to quickly take over control of the process if the other processor fails. The problem with this approach is the time that the extra processor needs to begin processing after a failure. In critical processes such as a nuclear power plant, any time lag could be unacceptable. Another approach is presented in U.S. Pat. No. 4,270,168 to Murphy et al., which uses a plurality of processors, self checks and joint answer checking to assure that each processor can assume real time utilization for another processor in the event of a failure. The increased reliability presented in these systems is a memory resident application that fails to address a large data base application spanning many data storage devices.

The general configuration of a data processing system. typically comprises a host processor or processors, a memory and various peripheral units. The peripheral units include terminals, printers, communications devices and DASD. We are concerned with the control that provides information from DASD to a data base application residing in the host processor memory. Further, customers have come to expect an increase in performance to accompany an increase in reliability. A good example of prior art approaches to this type of processing is presented in U.S. Pat. Nos. 3,999,163 to Levy et al., 4,067,059 to Derchak and 4,189,769 to Cook et al. These Pat. Nos. present various ways to enable a host to process information residing on DASD. While these patents describe production systems that readily lend themselves to database applications, they are lacking the capability of retaining status information when a power-off occurs in an environment designed to provide high availability of DASD information.

In a known data processing system, a memory control circuit connected to each of a plurality of memory banks selectively transfers the contents of an arbitrary first of the memory banks to a selected second of the memory banks in a manner whereby, if a first memory bank is written, a circuit transfers the contents into a second memory bank thereby preventing a loss of information. An example of such a system is illustrated in U.S. Pat. No. 3,866,182 to Yamada et al.

Various approaches to the efficient utilization of data storage devices through the usage of a cache are known, such as U.S. Pat. Nos. 4,504,902 to Gallaher et al., 3,938,097 to Niguette, III, 4,506,323 to Pusic et al., 4,530,054 to Hamstra et al., and 4,523,275 to Swenson et al. These approaches share the inability to perform logical write operations without updating the physical data storage device.

U.S. Pat. No. 4,574,346 to Hartung, one of the co-inventors in this application, discusses an enhanced control of data usage in a cached data storage system having a volatile cache and a backing store. Data is moved to the backing store as it is not needed. Data that is already in cache when a read request arrives is immediately serviced without data storage device access; however, write requests must still be serviced by accessing the physical data storage device.

SUMMARY OF THE INVENTION

It is therefore an object of this invention to provide a method for the improved management of data storage devices and the ability to perform logical write operations without accessing the physical data storage device.

It is a further object of the invention to provide the above mentioned capability without sacrificing the integrity of the data.

It is another object of the invention to provide the foregoing capabilities without changing current software applications on the host.

It is another object of the invention to provide the foregoing capabilities with increased performance of the data storage device.

It is yet another object of the invention to provide high availability of the data storage devices.

It is yet another object of the invention to use a finite length journal to track updates of DASD to provide increased reliability.

According to the invention, these objects are accomplished by accepting write requests from the host processor, keeping two copies of write information in cache and nonvolatile storage in the controller, signalling the host that a write operation is complete as soon as the cache and nonvolatile storage is updated successfully and writing the information to the data storage device later. A copy of the nonvolatile storage contents is periodically transferred onto a partition of a circular journal recorded on a nonvolatile medium and selected entries are periodically transferred from one partition to another partition of the journal after the destaged records have been eliminated. A method of employing the data storage devices to keep important status information nonvolatile for integrity purposes is also used.

The finite storage space of the journal is divided into equal partitions. For illustrative purposes k=3 is used in this application. Data recorded in the cache is formatted into records and pages with each record having a status field designating that no change has occurred to the record or an address in a journal partition for controlling the selection of entries for rewriting from one portion of the journal to another. Further, each page includes a status field which contains a reference bit for the page.

The invention guarantees that every change is recorded either in the journal or the DASD. Because of the finite length of the journal, free space must be made available routinely. With this system, no checkpointing of data to DASD is necessary and performance is enhanced by reducing the number of required DASD accesses by turning the cache into a highly reliable primary store.

The nonvolatile buffer (NVB) has a capacity that is less than the cache capacity. Every change to the cache is also written into the NVB. As the NVB fills, its contents are written to the journal in buffered postings, similar to batch postings.

The inventive method controls the flow of data to the journal. The method assures that the most recent copy of each changed item in the cache always appears in the journal or the NVB. This is accomplished by partitioning the journal and posting the changed items in the cache to the current journal. Each update written to the cache also includes the status field showing which partition is currently in use. The journal is partitioned circularly in an ordered fashion 1, 2, 3, 1, 2, 3,... If a record has been changed in the primary store/cache, then the journal address in cache record's status field indicates which of the journal partitions contain the current record, the journal partitions being written in the aforementioned circular order.

Briefly, during the time that, for example, journal partition 3 is being written, a scan is made of all journal addresses of the records in the primary store/cache. Since journal partition 1 is the next consecutive partition to be written into after journal partition 3 and it is desired to manage a finite journal, then all cache records having journal address 1 (stale records) are recopied into journal partition 3. Journal partition 1 will then be free/available. In the event that there is not sufficient space in journal partition 3, then the stale records would not be written to the secondary store (DASD).

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DESCRIPTION OF THE PREFERRED EMBODIMENT OF THE INVENTION

For purposes of illustration, the invention is described in the context of a shared access DASD cache managed by way of PASCAL processor-based control units. However, the subsequent teachings could be applied without the exercise of the inventive faculty to protecting the contents of a CPU cache in a cache main memory hierarchy or equivalents.

Shared Access Of A Staged Storage System

Figure 1:
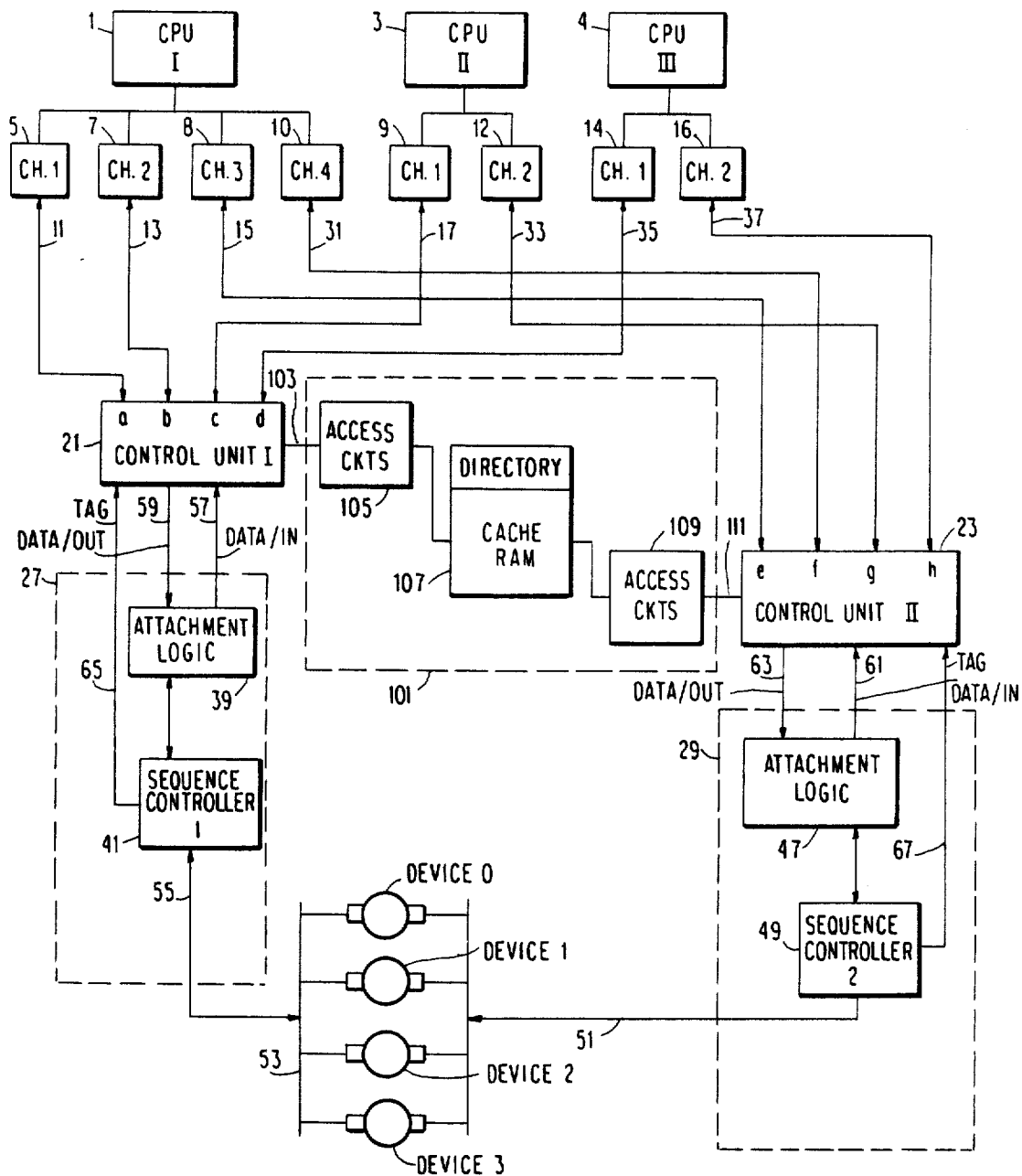
FIG. 1 depicts a shared access staged storage system with a shared access cache as the primary store to be found in the prior art.

Referring now to FIG. 1, there is shown a multi-CPU and shared DASD configuration within which the invention is embedded. Three CPU's 1, 3, and 4 are suitably crossconnected to a pair of control units 21 and 23 over counter-part channels. In this regard, CPU 1 attaches four channels 5, 7, 8 and 10. CPU 3 attaches two channels 9 and 12, while CPU 4 attaches two channels 14 and 16.

Channels 5 and 7 terminate in control unit 21 ports A and B, while channels 8 and 10 terminate in control unit 23 ports E and F. Channel 9 terminates in control unit 21 port C, and channel 12 terminates in control unit 23 at port G. Lastly, channel 14 terminates in port D of control unit 21, and channel 16 terminates in port H of control unit 23. The control units 21 and 23 share access to DASD devices 53 over counterpart paths including adapter 27 in line 55 for controller 21 and adaptor 29 in line 51 for controller 23. Control units 21 and 23 attach adapters 27 and 29 respectively over demand/response interfaces embracing tag and data lines. The interface between adaptor 27 includes tag line 65 and data/in and data/out paths 57 and 59. Likewise, tag line 67 and data/in and data/out paths 61 and 63 couple control unit 23 to adaptor 29.

The demand/response type interface is one in which the tag out identifies and validates the information on the data line out line. In this regard, each CPU/control unit/device operates asynchronously with respect to one another in which directional control is asserted from the top down. Between control units 21 and 23, there is juxtaposed a cache 101. This cache is accessed either through controller 21 over path 103 and access circuit 105 or through control unit 23 over path 111 through access circuit 109. The cache proper may consist of a RAM in a suitable high-speed main memory technology such as CMOS. Configuration of a DASD cache suitable for the practice of this invention is found in the IBM 3880 Storage Control Unit Model 13 described in IBM publication GA32-0062-0. Model 13 is designed as a high-performance cache DASD subsystem for use with IBM System 370 and especially MVS/SP Release 3 operating systems. The IBM 3880 Model 13 has two control units and a cache of between 4–8 megabyte capacity.

The set 53 of DASD includes devices 0–3. Each device is accessible through a device attachment unit over separate paths. Adaptor 27 provides a path through control unit 21 to any of the devices over line 55. Line 55 electrically terminates in a dispatchable arm containing a READ/WRITE head per device. Similarly, adaptor 29 provides an independent access path between control unit 23 over line 51 to another dispatchable arm per device. Each adaptor contains its respective logic (39, 47) and sequence controller (41, 49).

A CPU's relationship to DASD begins when the CPU invokes the START I/O instruction. This instruction serves to establish a connection between the CPU, an addressable device, and the execution of a channel program with the device. The invocation of the START I/O instruction causes control to be relinquished to a series of channel commands. The series or chain of channel commands (CCW's) is, in turn, sent over the channel to the control unit for selecting and accessing the device and effectuating any data movement across the interfaces. Each channel program consists of a sequential list of operations resident in the CPU main memory. The transmission to and the execution at the control unit of the CCW's takes place only after an initial connection between the CPU and the control unit has taken place. For each operation (CCW) in the channel program, one or more counterpart operations are required either at the control unit or device level over an active connection.

The first connection is that of an initial selection sequence. This selection is invoked with a START I/O operation in which an initial path is set up both electrically and logically in terms of device address (virtual/real) and device status (available/busy). The next active connection relates to that of CCW transfer and execution. A control CCW such as a SEEK requires physical positioning or activity at the device. The control unit in response to receipt of a control CCW can execute the CCW in disconnected mode. This means that the control unit disconnects from the channel while executing the indicated operations. The control unit does not require anymore channel activity until it reconnects to the channel. In a typical IBM 370 system as described for example in Clark et al, U.S. Pat. Nos. 3,725,864, Beausoleil, 3,336,582, and Boehner et al, 3,564,502, after a control unit has received a SEEK CCW and the parameters (target address), it disconnects for 30 milliseconds or more. Thirty milliseconds is the average time it takes to dispatch an accessing arm of a DASD in order to arrive at the tracks of a cylinder of interest. During this "dead time", both the channel and control unit are free to establish other connections. In contrast to disconnected modes, CCW's involving the movement or transfer of data between the channel and the device such as READ or WRITE CCW's require the control unit to remain connected to the channel in order to effectuate data transfer.

Each CCW must be obtained from the list in the CPU main memory and transferred over the channel to the control unit. At the control unit the CCW is executed. Subsequent to execution, there occurs an ending sequence. If the CCW is of the control type requiring device positioning, the control unit disconnects from the channel and must also reconnect when the control or device positioning has been completed. It is then followed by an ending sequence.

Active connection between elements for executing operations is necessary for extended periods only in respect to the movement of data. Either control unit 21 or 23 responsive to a READ CCW accesses the cache directory to ascertain if the data is resident. If there is a "hit", movement is between the RAM cache and the channel through the control unit. In the case of a WRITE CCW, movement is from the channel to the cache through the control unit. If the cache is of the "write-in" type and there is a "hit" (space available or a record to be updated), then data is written therein and subsequently copied to the DASD. If the cache is of the "write-through" type, then data is written independently into the cache and the DASD.

It is to be appreciated that a cache provides a large random access memory (RAM) that holds copies of some of the records of the disk. If cache 101 is operated as a "write-in", then the random access memory 107 also may hold records that have been sent to the disk from the attached processors and that have not yet been written upon them. A directory describes the contents for disk cache using block allocation. The directory is also stored in RAM 107.

Primary/Secondary Store Relations and Attachments

Figure 2:
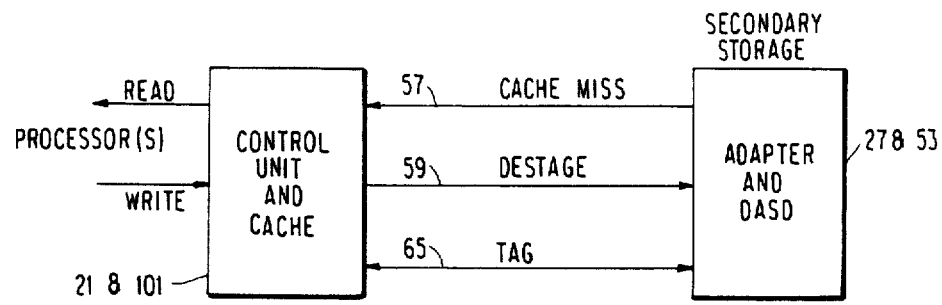
FIG. 2 sets out the primary and secondary store staging and READ/WRITE relationships.

Referring now to FIG. 2, there is shown a unitary control unit 21 and cache 101 coupled to a unitary adaptor 27 and DASD 53 across a typical demand/response interface. Indeed, all devices attaching the control unit 21 or 23 must conform to a standard electrical and message passing protocol. Typical protocols for DASD's attaching an IBM-type storage control unit are to be found in Bowers et al, U.S. Pat. No. 4,223,390, issued Sept. 16, 1980, and the references cited at column 7, lines 52–60 therein. Additional details may be found in Bass et al, U.S. Pat. No. 4,262,332, issued Apr. 14, 1981. Since the demand/response protocol and addressing of attached devices is not per se the subject of this invention, a detailed device level description is not included herein. Rather, the ensuing description is from the perspective of the control unit executing flow of control in FIGS. 4 and 5 and the PASCAL fragments responsive to each READ/WRITE CCW received from the CPU's.

Figure 3:
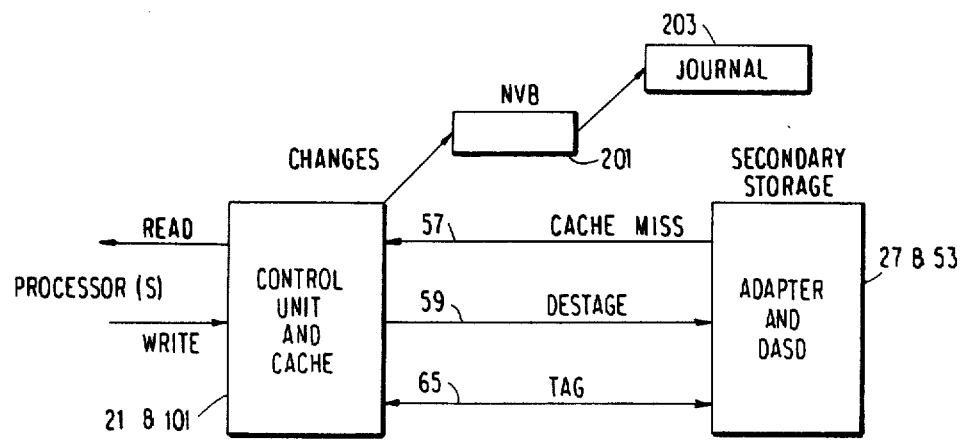
FIG. 3 exhibits the READ/WRITE relationships of staged storage together with the nonvolatile buffer and finite journal of this invention.

Referring now to FIG. 3, there is shown the addition of a nonvolatile buffer 201 and journal 203. Preferably attached at a typical device port of the IBM 3880 Model 13, the nonvolatile buffer 201 is preferably in the form of an addressable RAM in CMOS memory with a battery backup while the journal may be either an IBM 3380 DASD or a tape file such as the IBM 3420. An example of such a nonvolatile buffer memory system in CMOS may be found in Lancaster, "CMOS Cookbook", published by Howard W. Sams, Inc., Indianapolis, Ind., in 1977.

The Method

Cache management operates on units of data called pages. Within each page are subunits of data termed records. When a record not in the cache is referenced by the attached CPUs, then all or part of the page containing that record is read into the cache from secondary storage. Each record format includes a status field containing two bits. If the record stored in the cache matches the record stored in the secondary storage system, then the bits remain set to zero. If a record has been changed in the cache and this change has not yet been made in the secondary storage, then the bits indicate which of three external journal partitions or logs the changes were last written to, or were intended to be written to, if the NVB containing them has not yet posted its contents to the journal.

The journal partitions (logs) are written in circular order 1,2,3,1,2,3...etc. During the time that journal partition (log) 3 is being written, it is necessary to check the journal partition (log) addresses of all records in the cache. If the cache contains records whose status bits indicate that the updates have been posted to journal (log) 1, then these entries must be relogged. "Relogging" means that records are recopied to journal partition (log) 3.

Now, when the time comes to use journal partition (log) 1 again, all of the cache entries therein can be written over. Ideally, any relogging (rejournaling) required should fit into journal partition (log) 3. All journal extent (log) addresses as previously described are checked prior to the time when the amount of free space left in the journal extent (log) decreases to a predetermined threshold. In the preferred embodiment, provision is made to guaranty that all data that must be rejournaled (relogged) will at that time fit in the current journal extent (log). For other embodiments, in the event that it does not fit, a provision such as posting to secondary storage can be instituted.

In a journal having three or more sufficiently large partitions, the destaging of data by the normal operation of the cache reduces the amount of data that must be rejournaled (relogged) to a very small amount.

Each page of records stored within the cache has its status represented by a reference bit. The reference bits are used to control the scanning of records for stale records. All page reference bits are "turned off" (set to zero) whenever a changeover to a new journal partition (log) occurs. When a new page is brought into the cache, its reference bit is turned on. Whenever a record in the cache is referenced and its page reference bit is off, the bit is turned on and the records contained in the page are scanned to see if any need to be rejournaled (relogged). Thus, a record is scanned only if it was in the cache at the last journal partition (log) changeover and if its page is referenced for the first time since that changeover. This spreads the scanning out over time. That is, many pages are either newly brought into or leave the cache without being referenced again after the changeover. Thus, the set of scanned pages is significantly smaller than the entire set of pages in the cache.

The question of determining whether every page of the cache is eventually scanned by the above technique is now discussed.

In many cache management methods, there exists a maximum lifetime an unreferenced page can reside in the cache. In the case of LRU cache management, a page in a cache of n pages will be destaged or written over if n cache misses occur following a reference to that page. In another cache management technique termed "clock management", each page has its status represented by a "use bit" that is turned on whenever the page is referenced. When a page must be selected for replacement, a cursor moves through the "use bits" in a fixed sequence. The cursor turns off any "use bit" tested that is on and stops when a use bit that is already off is found. The page associated with that use bit is replaced. A page in a cache of n pages in the clock scheme will be destaged or written over if 2n use bit tests occur in the cache system following a reference to that page. Consequently, there exists a sufficient condition that is readily ascertainable in order to determine if every page that must be scanned has in fact been scanned. In general, the page reference bits can be directly checked to find if any are off.

There exists the possibility that scanning is not completed before the available journal partition (free log space) falls to a specified threshold H. If this occurs, then the pages not yet scanned since the journal partition (log) was started are then scanned. In this embodiment, the journal extent (log) size and H are chosen such that the scanning is completed by this time with high expectation. Moreover, the journal extent (log) is sufficiently large such that if rejournaling (relogging) is required, then all rejournal (relogged) data can be written to the current journal partition (log). If, however, the journal partition (log) size is small such that it cannot hold all of the data that must be rejournaled (relogged), then those records which cannot be written to the journal partition (log) are written to secondary storage.

In the event of primary store failure, recovery can be accomplished in the following manner. It must be first ascertained from data in the journal partitions and in the NVB which of the records is the most recent entry and which of the records is the oldest entry. This is facilitated by having stored with each record, a time stamp or sequence number. Also, the secondary storage address has been recorded with each record field in the journal partitions and in the NVB. The journal partitions and then the NVB may be processed from oldest to newest entry and each entry may then be written to its secondary file address. It should be observed that the faulty primary store need not be repaired. The only necessary condition is that the recovery subsystem be able to read the journal and the NVB and write to the secondary file. In the event of failure of the recovery subsystem during the restoration process, the procedure can be repeated at yet another time.

The Method Flow Of Control

Figure 4:
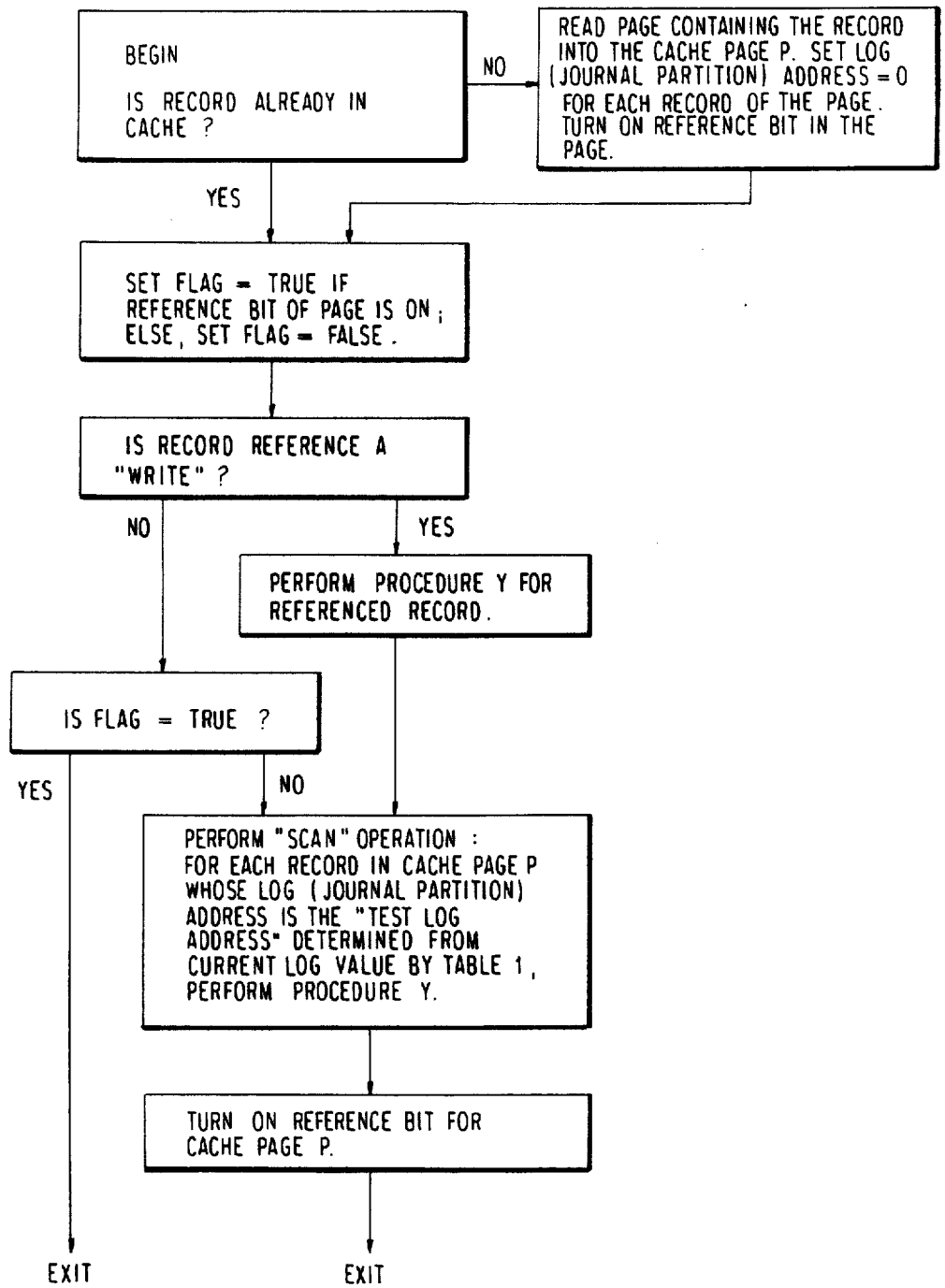
FIGS. 4 and 5 are block diagrams showing the flow of control of a process implementing this invention each time a record in primary store/cache is referenced.
Figure 5:
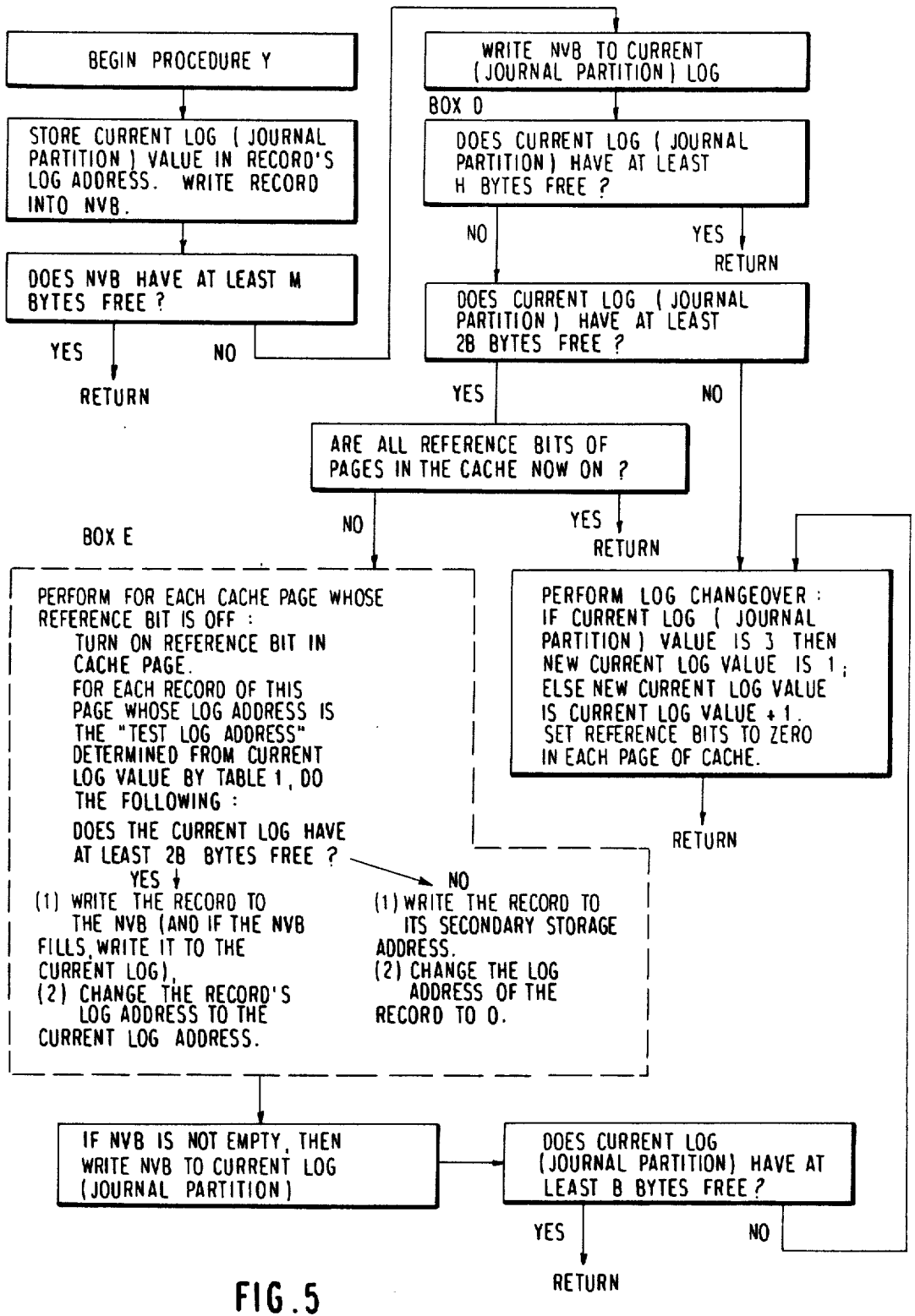

Referring now to FIGS. 4 and 5, there is shown the flow of control of the method implementing this invention each time a record in primary store/cache is referenced by either a CPU READ or WRITE CCW.

The steps shown in FIG. 4 are to ascertain whether a record is present in the cache, its record and page status, whether it is a read or write, and initiate the cache scanning operation. FIG. 5 treats the concurrent copying of updates to the cache and NVB, determining the subset of cache records journaled in the next successive partition and resident in cache which must be relogged in the current journal, ascertaining whether the currently written journal has sufficient space to record the reloggable set from the next journal partition, and writing either to the current journal or posting to the secondary storage.

In the further discussion, let P be the page that contains the referenced record. Note that the record's journal partition log address and time stamp are written to the NVB along with the record for use in case of system failure. Further, let M be the maximum record size, N the size of the cache in bytes, B the size of the NVB in bytes, and H the threshold on the amount of journal partition free space that determines when to complete scanning the cache for stale records. In this embodiment, the relationship among H, B, and N is $$H = 4B + N + 1.$$

If L be the size of each journal partition in bytes, then in the preferred embodiment $$L > N + H.$$

The following relations must also hold:

$$L > H + B,$$

$$H > 3B,$$

$$B > M, \text{ and}$$

$$N > B.$$

Referring now to FIG. 4, if the record is already in the cache and the CPU makes thereto a write reference, then a branch is made to perform procedure Y, the subject matter of FIG. 5. A write reference of a record already in cache means that the update must be posted into the NVB. First, since the maximum record size is of M bytes, does the NVB have at least M bytes available for write-over. If it does, then the procedure Y is complete and processing continues, in FIG. 4. If the amount of space available in NVB is less than M, then a writing of the current NVB contents to an appropriate freed-up journal partition and other subsequent processing is invoked.

If LF is the number of free bytes in the current journal partition, then initially $LF = L > H + B$. Before the first test as to whether the current journal partition (log) has at least H bytes free, it follows that there can be at most only B bytes written to the current journal from the NVB. So that with respect to the first reference, the current journal partition should have at least H bytes free. Now, at the time of the next write reference, the number of bytes available in the current journal partition L may be decreased by at most B bytes again. At the point in time when the current journal partition has less than H bytes available, then $LF > H - B > 2B$. This ensures that the functions designated in "box E" are executable if all reference bits of the cache are not on by this time. Box E will not be entered again until a journal partition changeover has occurred because the reference bits are all turned "on" following box E.

If the current journal partition does not have at least H bytes free, then in the preferred embodiment $LF > 3B + N$. This means that the current log must have at least 2B bytes free since at most N bytes of data must be logged. Thus, with the constraint of $H > 4B + N$, the reloggable data will always fit into the current log. The reason that $L > N + H$ is preferred is so that most or all of the pages in the cache will be referenced before the available number of bytes in the current journal partition falls below H bytes. As a further consequence, upon exit from procedure Y there are always at least M free bytes in the NVB and B free bytes in the journal.

Referring now to the Appendix, there is set out a PASCAL implementation of the process exhibited in FIGS. 4 and 5. In this regard, PASCAL is a preferred form of writing system control codes because the flow of control is readily apparent and thus simplifies maintainability. Also, the language lends to top-down structured programming.

The functional modules are termed "procedures". The scheduled invocation (sequencing) of the procedures is set out in the mainline program in the Appendix between lines 165-183. By design, PASCAL is a heavily typed language which means that all constants, variables, and data structures must be defined and precede the procedures and main program which utilize them. For this invention, the constants bounding the system such as record size N number of bytes in cache B, etc., are set out in lines 1-4. On line 5 there is defined a variable page which is a bounded array of 512 characters. Lines 6-18 are the various indices and status terms called pages, records, and their location, i.e. cache, NVB, journals or logs.

Each of the procedures is heavily commented as to its functional significance. The correspondence between the flow of control of the procedures and mainline program set out in the Appendix and that set out in FIGS. 4 and 5 is readily apparent to the skilled artisan.

The technical advance represented by the above described invention resides in the use of a nonvolatile buffer together with a nonvolatile journal to protect the volatile primary storage system against loss of changed data. In this invention, a circular journal is always made to contain, by rewriting of old entries, a copy of every changed item that resides in the primary store/cache. Scanning of an entry in the cache for the need to rejournal the entry is done at the time the entry is referenced. This procedure spreads the scanning over time and reduces the amount of scanning required. Appropriate use of a reference bit per page of a primary store/write-in cache substantially reduces the number of scans required to check for records that must be rejournaled prior to reuse of a part of a journal.

Alternate Embodiment Of Fast Write

The following disclosure describes a method for improved management and performance of data storage devices and the data stored on them. Status and identification information is retained on the data storage devices and a backup medium to assure the retention of information when a power out or other disablement of the devices occur and to verify that the correct physical devices are still attached to the controllers when the data storage device resumes operation.

Hardware Environment

Figure 6:
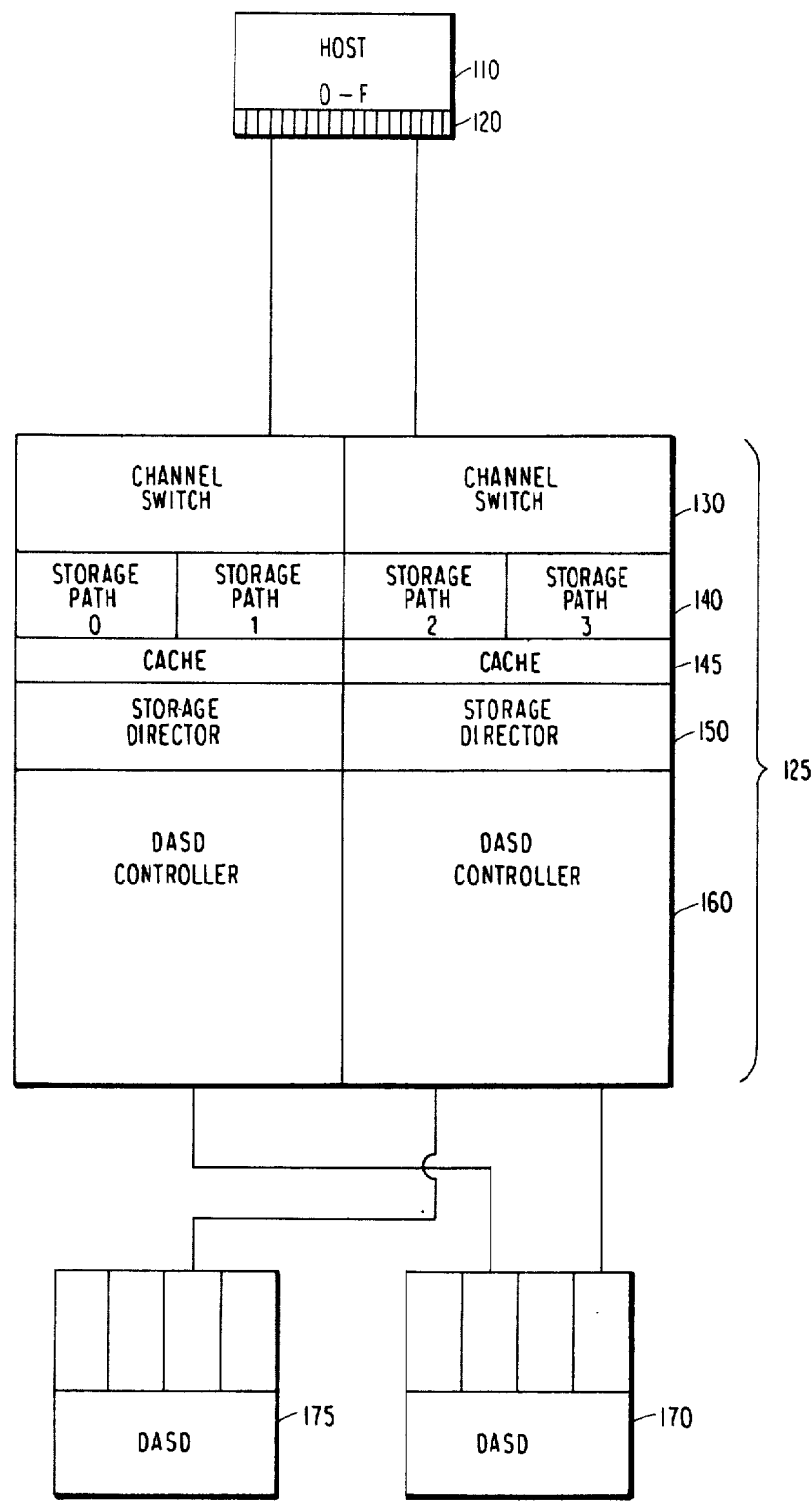
FIGS. 6 and 7 are block diagrams showing the basic elements of the new data storage system.

Referring now to FIG. 6, there is depicted an improved data storage system. The host 110 has a plurality of channels 120 communicating via tag and bus cables to a DASD controller 125 which manages the flow of information from the DASDs 170 or 175 to the host 110. An example of the host 110 is the IBM 3090. processor. The IBM 3090 is a compatible growth system which uses either Multiple Virtual Storage/Extended Architecture (MVS/XA) or Virtual Machine (VM) operating systems. The operating system controls the flow of data to/from main storage and provides an application environment which is System/370 compatible. The IBM 3090 processor is described in more detail in IBM publication, 3090 Processor Complex Installation Manual Physical planning, GC22-7074. The controller 125 contains a pair of storage paths 140, a high speed cache 145 and two storage directors 150 for independent control of attached DASDs 170 or 175. Each of the two directors 150 can control up to thirty-two actuators through the four storage path processors 140. Two, Four, and eight channel switching is available through channel switches 130. The DASD controllers 160 provide attachment for up to two strings of DASD devices each. A good example of a DASD 170 or 175 is the IBM 3380 which devise, which provides a fixed medium head and disk assembly (HDA) that contains the heads, disks and access mechanisms (actuators) within a sealed enclosure. Each 3380 unit contains two HDAs. There are two independent, movable actuators within each HDA. Each actuator has its own address which is selectable from the host 110. A string of DASDs attached to a 3880 storage director of the prior art can contain four units (sixteen actuators). A more detailed description of the IBM 3380 DASD is found in IBM publication, 3380 Description and User's Guide, GA26-1664.

To understand the subject invention, it will be necessary to discuss some of the details of the DASD system operation.

When the host 110 requires information, it requests it by requesting a specific channel, controller and DASD actuator. The channel number is a one byte hexadecimal number, the controller number is a four bit hexadecimal number and the DASD actuator number is a four bit hexadecimal number. For example, if the host sent a two byte hexadecimal address 0111 in a start input/output (I/O) operation, then actuator one, attached to controller one, would prepare for an I/0 operation and send the host a ready signal. Since the mapping down and back is the same, the original transaction header can be used to determine the path back to the host. Any host program accessing the DASD could send the header described above to uniquely define the DASD actuator to access.

Figure 7:
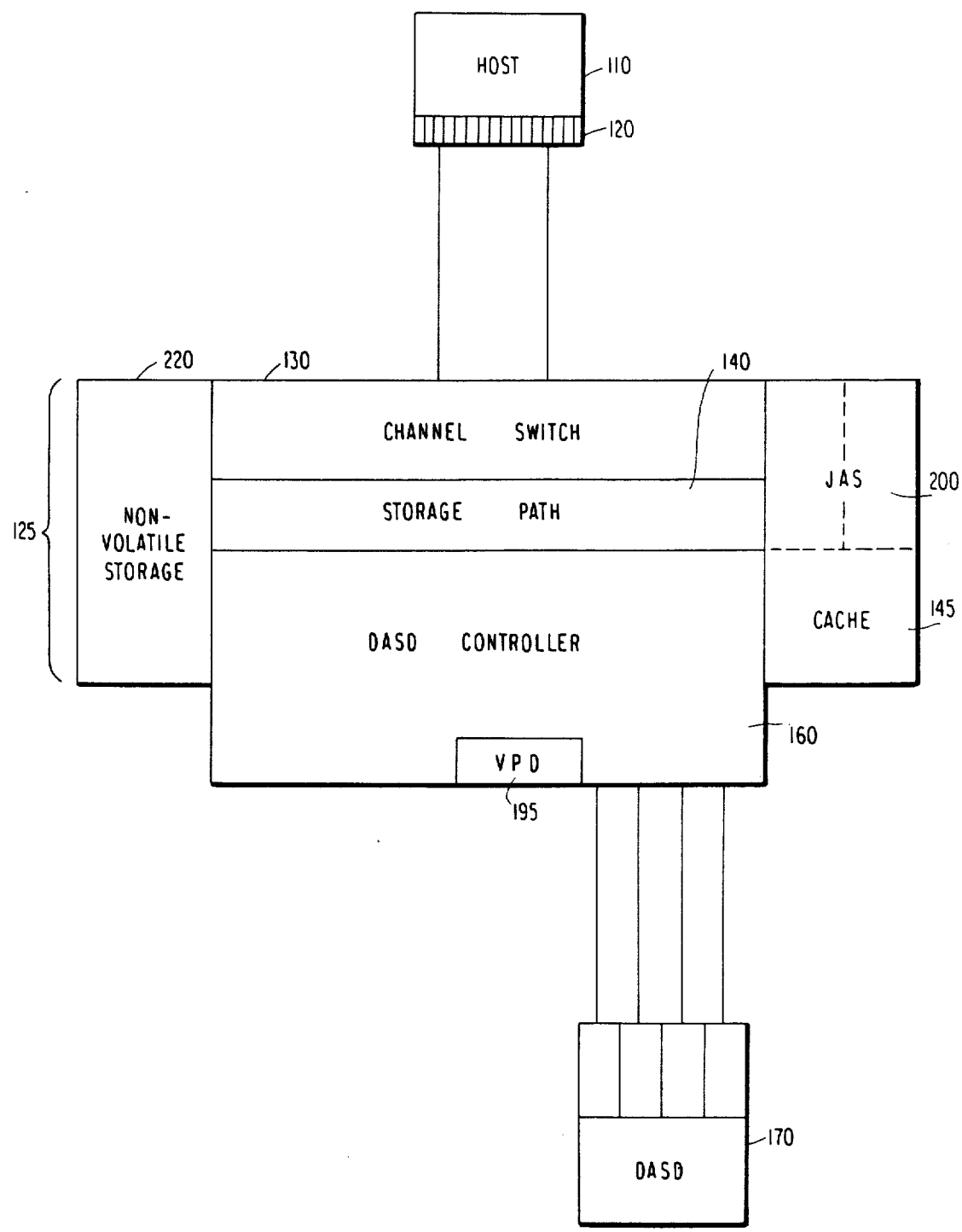

Referring now to FIG. 7, a diagram showing the basic elements of the new data storage system is shown. Like numerals refer to the same or similar components as in FIG. 6. The basic structure is very similar to FIG. 6. A host 110 is attached via its channels 120 to a DASD controller 125 which is attached to DASDs 170. Information is passed through the described path to the host. The subsystem status contains information used to manage the data storage system and the nonvolatile storage 220. The DASD controller 160 also contains an EPROM vital product data area at 195. The vital product data area contains pointers to the global status track.

The joint array structure (JAS) 200 is used to conserve the host to DASD interface and implement the dual copy, high availability functions. The dual copy function provides enhanced data availability and reliability by maintaining two identical copies of volumes, called a duplex pair, on two physically separated DASD units as, for example, the primary data storage device 170 and the secondary data storage device 175. The dual copy has a first copy of the data which is referred to as a primary copy and a second copy which is referred to as a secondary copy.

Once the duplex pair is established, the DASD controller 160 provides an image of the duplex pair using control information kept in the JAS 200 as a single highly available volume. Both volumes of the duplex pair are updated as a result of a single write request. A single read request to a dual copy data storage device is handled in accordance with normal cache algorithms unless the data is not in the cache in which case the controller attempts to read the data from the primary device. Reads which fail on the primary device are attempted on the secondary device of the duplex pair.

The other feature that is unique to this invention is the nonvolatile storage 220. The dual copy function requires the nonvolatile storage 220 for operation. The nonvolatile storage is used to hold transferred data so that the subsystem can signal completion of a write operation before the actual write to DASD transpires. This feature also provides information necessary for re-synchronizing two volumes of a dual copy pair when a failure is repaired.

Joint Array Structure

Figure 8:
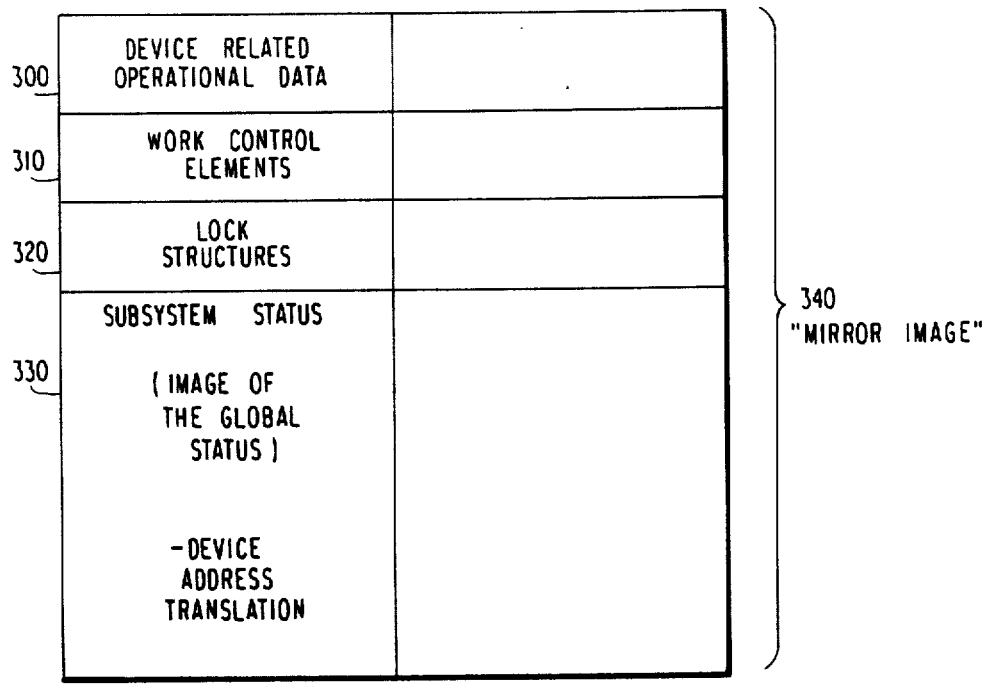
FIG. 8 is a block diagram showing the parts of the joint array structure.

The JAS 200 conserves the host interface by translating the host header described in FIG. 6 into the actual physical DASD actuator through the use of a pair of translate tables. The first table is used to translate the actuator address and the second table is used to translate the return host address. The structure of the joint array is shown in FIG. 8. The joint array structure comprises a sixty-four byte area to support device address translation. The JAS 200 also contains device related operational data 300, work control elements 310, lock structures 320 and subsystem status information 330.

Figure 9:
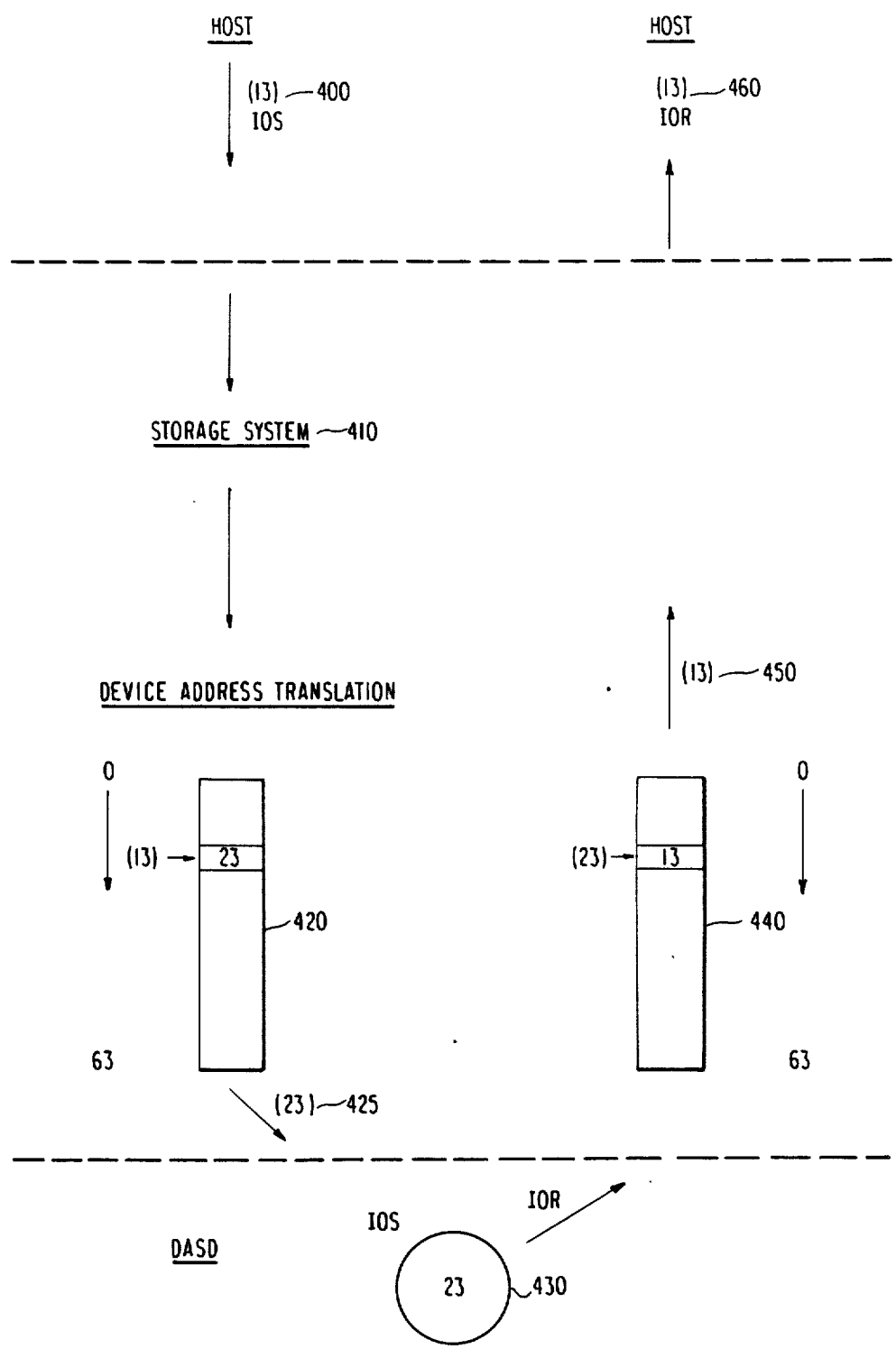
FIG. 9 is a flow diagram showing the flow of a data storage request from the host to the storage system and back.

A mirror-image of the control and status information listed above is contained in the other half 340 of the JAS 200 for redundancy. The subsystem status information 330 includes the global status and the device address translation. The device address translation provides the address lookup capability necessary to conserve the system interface and still take advantage of the dual copy feature, nonvolatile storage and global subsystem status. An example will help to clarify the usage of the address translation table. In FIG. 9, a host application has requested an I/O start of actuator thirteen 400. This request goes out over the channel to the storage system controller 410 where the thirteenth byte of the sixty-three byte address table 420 is accessed to obtain the actual address of the actual actuator that host address thirteen is mapped to. Twenty-three is the actual actuator address as shown at 425, so actuator twenty-three is prepared for I/O and returns an I/O ready signal at 430. However, to determine where to send the signal, it is necessary to look up the return address in the return address table of the data address translation at 440. The return address is thirteen as indicated at 450, and this value is used to return the I/0 ready to the host at 460. The use and initialization of the device address translation tables is presented in more detail below.

Data Storage Status and Device Information

To understand the method better, a preferred embodiment is described employing the environment presented in FIGS. 6 and 7. A first data storage device 170 and a second data storage device 175 each have a dedicated status track for the retention of status information. The dedicated status track is unusable by non-system applications and retains two copies of the global subsystem status for the controller and the first and second data storage devices. The storage subsystem is the set consisting of the controller and the attached data storage devices. In the example, this consists of the single controller 125 and the two data storage devices 170 and 175.

Status information about the subsystem is retained across power downs by writing a single record of status and identification information twice on the status track of each device. Global subsystem status is also kept on the first and second data storage devices 170 and 175. Device information is kept on all the devices in the subsystem, but global subsystem status is only kept on the two global data storage devices. The global subsystem status portion of the record is formatted but not used if the device is not one of the two global subsystem status devices.

The global status pointer contains address information about the two data storage devices and a count of how many times the devices have been reassigned, which is used at initial program load to determine which is the most current copy of the global status pair.

The global status pointer which is a four byte field including the one-byte address of each of the data storage devices including the first 170 and second 175 global data storage devices and a two-byte number which indicates the number of times the definition of the data storage devices have changed. Global status contains the status of the subsystem components, the cache store 145 and the nonvolatile storage 220, and devices 170 and 175 as established by failure or system commands.

Duplex Pair

Four data storage device states are defined with respect to the dual copy function:

Simplex or "single copy" volume. The data storage device is treated as though it were attached to a subsystem which does not provide the dual copy function. No secondary data storage device is maintained. All read/write activity accesses the addressed data storage device only.

Duplex or "two copy" volume. The two volumes, primary and secondary, are identified as a duplex pair. Only the primary data storage device is directly accessible by the host systems. The secondary data storage device rejects all direct host calls except error diagnostics.

Duplex Pending is a temporary state. The two volumes, primary and secondary, are identified as a duplex pair and the subsystem carries out a copy to synchronize the two devices. Only the primary data storage device is directly accessible by the host systems. The secondary data storage device rejects all direct host calls except error diagnostics.

Failed Duplex is an error state. The two volumes, primary and secondary, are identified as a duplex pair. Either an attaching host system has requested that the subsystem should not continue duplicate writes for this duplex pair or the controller has determined that it was unable to synchronize the contents of the two volumes and has suppressed duplicate writes. In this state, a bit map is maintained in nonvolatile storage to track the cylinders written in this mode. The subsystem will begin recovery operations as described above when this state is detected.

Once the duplex pair is in the full duplex mode, the controller ensures that the two volumes are identical by updating both volumes as the result of any write issued to the primary data storage device of the pair. This duplicate write is transparent to the attaching host systems. The duplicate update is accomplished by orienting the primary data storage device and performing a branching write, updating the primary data storage device and capturing only the data necessary to duplicate the write to the secondary data storage device.

Fast Write Operation

The performance benefits of cache are limited to read operations where the data exists in the cache. Generally, all data in write operations goes directly to the data storage device as well as cache in order to keep the data current on a nonvolatile media. Fast write extends the performance benefits of caching to write commands without impacting the reliability or availability of the accessed data. Without fast write, writes require a data storage device access to ensure that the data stored as a result of the write request will not be lost as a result of a loss of power to the controller.

In order for DASD fast write to function, the following environment must exist:
(1) Nonvolatile storage must be available in the controller.
(2) Subsystem storage must be available.
(3) Caching must be active.
(4) Fast write must be active for the device.
(5) The data storage device must have a standard format. Specifically, it must have standard record lengths (record zeros), and it must have unique record identifications.

There are two types of fast write operations: cache fast write and DASD fast write. Both fast write operations can improve performance for write hits of write operations.

Cache Fast Write

Cache fast write is an option that the user may select to use on special kinds of data, such as temporary data created by Operating System Utility programs. These programs routinely keep data in cache and they do not write the information to DASD until the program has completed successfully and then only if the data is to be retained. For these types of operations, the nonvolatile storage is not necessary. For cache fast write applications, only the cache is updated when a write operation is performed. If data is lost because of a cache or subsystem failure, the program is notified and the program can be rerun if the user desires.

DASD Fast Write

DASD fast write requires that the nonvolatile storage feature be installed. The nonvolatile storage feature provides random access electronic storage for data. The nonvolatile storage is on a separate power boundary for data protection, but if power is lost, a battery backup system maintains power in the nonvolatile storage for a minimum of forty-eight hours to prevent data loss. When power is restored, the data in the nonvolatile storage is destaged to DASD before any operations are allowed to the fast write volume. The controller has no single point of failure between the cache and the nonvolatile storage and there are separate data transfer paths to allow concurrent transfer of data to cache, nonvolatile storage and DASD. The hardware is also designed to automatically transfer the modified data in cache or nonvolatile storage to DASD and terminate fast write in the event of a cache or nonvolatile storage failure.

Fast write applies to all cache write hits and predictable writes. A cache write hit involves encountering a set of records that are already in cache in their updated form. A predictable write is a write which only requires the preformatted portion of the track (header and record zero) and does not require user data. Fast write is not applied to cache misses (except for predictable writes) because commands are not guaranteed to be predictive (imbedded error situations can occur). Imbedded error situations must be detected and reported prior to the completion of the activity of the commands since they will typically affect the function that should be performed. As an example, prior to indexed volume table of contents (VTOC) support, insertion of a new data set on a volume involved execution of a command which would search the entire VTOC looking for a data set which had a name the same as the data set to be added. If such a duplicate data set name is found, the new data set is not added; otherwise, the new data set is added by a subsequent command. The command which searches for the duplicate data name relies on a No Record Found to indicate that no duplicate exists. For this case, No Record Found must clearly be reported synchronously with the execution of the commands.

Additionally, for some commands, the count field for a record must be examined in order to determine the key and data lengths of accessed records. The data contents of an accessed track must be examined in order to determine what activity should be performed by the command accessing the track.

Predictable Writes

Predictable writes encompass a subset of write operations which are allowed to write to cache without the track in cache. Predictable writes are possible because the orientation is to an area that is standard on all tracks and the operation is not dependent on the existing track format. These operations are full track format writes and orient to the Home Address or Record Zero which are standard on all known DASD. Predictable writes reformat the track from Record Zero, so they are not dependant on the existing track format. The Predictable write operation writes directly to cache and to nonvolatile storage if the DASD fast write is applicable, creating an image of the track in cache. The write is length checked based on a standard Record Zero length of eight bytes to assure that the write does not exceed the track capacity. If it does exceed the capacity, an Invalid Track Format error is presented like a DASD write operation would return. At some later time, determined by the destage algorithms, the track may be moved to DASD.

Fast write extends to writes the performance benefits that caching has provided for reads. This results in significant performance improvements in both throughput capability and response time. The data integrity, data availability and data serviceability are maintained for the fast write system. No host software changes are necessary to implement the fast write function.

Fast write uses a nonvolatile storage area to assure the integrity of data without performing an actual write to a data storage device. Each data modification is simultaneously stored in two locations in the controller until the actual data storage device update takes place. One copy is maintained in cache, the other in the nonvolatile storage. Two copies of the data are essential in order to maintain data availability comparable to that of standard data storage devices. There are failures within the controller which can make the nonvolatile storage or the cache unavailable to the subsystem. If the subsystem only maintained one copy of data modifications, any failure which made the array containing that data unavailable would compromise the data's integrity.

The fast write is accomplished by performing a branching write, updating the nonvolatile storage and the images in the cache simultaneously as a result of a single transfer of data from the channel to the controller. Fast write is allowed only if an image of the track is in cache or if the operation is a predictable write. If an image of the track is in cache the cache space is previously allocated but may have to have additional segments allocated for format write operations.

A clean final status (channel end and device end) is sent as soon as the data transfer to cache and nonvolatile storage is successfully completed. This status is a commitment by the controller that the data is successfully stored in the controller and will be available for any later reference.

Data movement from the cache/nonvolatile storage to the data storage device occurs as a result of an internal controller that performs anticipatory destaging. Anticipatory destaging is designed to avoid an instance of a write request being delayed because there is not space available for allocation in both the nonvolatile storage and the cache. Anticipatory destaging maintains a buffer of unmodified space in both the nonvolatile storage and the cache. Space in these buffers is immediately available for allocation to satisfy requests to the controller. The amount of available space maintained in each of the buffers is such that concentrated bursts of activity which require space allocation would rarely result in a write being delayed by space allocation. Should such delays be necessary, destaging will take priority over other internal subsystem activity until the need for the delay is eliminated.

Unlike the general replacement algorithm for the cache where the least recently used (LRU) information is replaced, the destage candidate selection algorithm is a first written, first replaced algorithm. This algorithm is based upon two elements of nonvolatile space management. First, the nonvolatile storage is managed as a circular buffer. When space is needed for allocation, it is allocated immediately in front of a free space pointer. Another pointer indicated the oldest valid data in the buffer (the valid data located the closest in front of the free space pointer). As long as the indicated data transfer can reside in the space between these two pointers, allocation occurs and the transfer begins. Anticipatory destaging attempts to maintain the amount of free space at some predefined value. Second, the nonvolatile storage treats currently allocated space as home areas for any new modifications to the data (records) in that space. If a modification is to be made to a record, allocation determines if an entry for that record exists in the nonvolatile storage. If it does and the record is not being reformatted, the update occurs to the pre-allocated nonvolatile storage space. If no allocation exists or if the record is being reformatted, then new space is allocated, the update occurs to this space and the old space occupied by the record is indicated as not containing valid data.

Once a destage candidate has been selected, the controller is examined to determine if any other modifications for the same track or other associated tracks are present. If there are other modifications, the complete set of updates to the track are made as a result of the destage for the selected candidate. Thus a single DASD access can update the DASD for multiple channel accesses.

Fast write is transparent to the host application. The controller manages the nonvolatile storage and data movements between the cache and the data storage device without any host involvement. The controller also handles the error recovery and status logging facilities.

When a duplex pair is established, fast write can be specified. If the primary device has fast write active, then the pair will be in fast write mode. Fast write will not apply while the copy to establish the pair is in process. Once the copy is complete, the normal dual copy algorithm will be used on cache misses. On cache hits the following procedure is performed:

(1) The data from the host will be written to the subsystem storage and the nonvolatile storage.
(2) Device end will be immediately presented to the host, however the device will remain busy until the data is destaged to the primary device.
(3) The data in the nonvolatile storage will represent the data on the secondary device.
(4) If the secondary fails, all fast write entries in the nonvolatile cache are freed and all cylinders that have entries on the nonvolatile cache are marked as out of synchronization. Fast write will continue in a modified operation. Writes will go to cache and nonvolatile store and complete the channel program. Then, the modified data will be immediately destaged to the DASD.
(5) If the primary fails, then the entries in the nonvolatile cache are immediately destaged to the secondary. Fast write will continue in a modified operation. Writes will go to cache and nonvolatile store and complete the channel program. Then the modified data will be immediately destaged to the DASD.

The controller assures high availability by maintaining two copies of every piece of information stored. If either the primary or the secondary data storage device fails, the controller can efficiently replace the faulty device, copy the information from the working data storage device, and bring the dual copy back into synchronization without any loss of information.

While the invention has been described in terms of preferred embodiments in a specific operating system environment, those skilled in the art will recognize that the invention can be practiced, with modification, in other and different operating systems within the spirit and scope of the appended claims.

APPENDIX

```
1.  Program NVBCache; Const M = 250; (*max record size*) N = 4096; (*number of bytes
2.  in cache*) B = 512; (*number of bytes in NVB*) L = 10000; (*number of bytes in
3.  log*) H = 6145; (*free space threshold in log before scanning is done*) NPAG =
4.  8; (*number of pages in cache*) RECS = 2; (*max. records per page*)
5.  Type page = array (.1..512.) of char;
6.  Var filename:string(.30.); currlogindex:integer; (*current log index; initially
7.  1;*) NVBytesfree:integer; (*free bytes in NVB; initially B*)
8.  currlogbytesfree:integer; (*free bytes in current log; initially L*) incache,
9.  (*true=> record is in cache (hit) *) refflag:boolean; (*flag that is true if
10. reference bit of cache page was on*) isread:boolean; allon:boolean;
11. cachecontents:array (.1..NPAG.) of
12. integer; (*addresses of pages in cache slots*) reclogaddr:array
13. (.1..NPAG, 1..RECS.) of integer; (*first index is page num
    second index is rec num*) reclength:array
14. (.1..NPAG, 1..RECS.) of integer; (*first index is page num
    second index is rec num*) rumrecs:array
15. (.1..NPAG.) of integer; (*number of records in page i of cache*) refbit:array
16. (.1..NPAG.) of integer; (*reference bits, initially 0*)
17. recnum,refnum,pagenum,testlogaddr:integer; i,cacheloc,trials,j:integer;
18. inp:text;
19. Procedure genreq (Var pagenum, recnum, refnum:integer; Var isread:boolean);
20. (*generate an I/O request from an input trace;
21. the trace gives 'pagenum' of cache page that the incoming page is put in
22. 'recnum' = record number within page of the reference
23. 'refnum' is secondary storage address of page
24. 'isread' is true if reference is a read, false otherwise*) begin
25. readln (inp,pagenum,recnum,refnum);
26. isread:=false; (*for this test, all are writes*) end;
27. Procedure writenvb;
28. begin;
29. (*write contents of NVB to the current log.
30. If NVB not full, write what is there only.*)
31. currlogbytesfree:=currlogbytesfree-(B-NVBbytesfree); (*update value*)
32. NVBbytesfree:=B; (*update value*)
33. end;
34. Procedure writerectonvb(pagenum,recnum:integer); begin
35. (*write the record from page pagenum, record recnum to the NVB*)
36. NVBbytesfree:=NVBbytesfree-reclength(.pagenum,recnum.); (*update*) end;
37. Procedure checkcache (refnum:integer; Var incache:boolean); Label quit;
38. begin
39. (*return true if secondary storage page 'refnum' is in cache, false if not*)
40. for i:=1 to NPAG do if cachecontents(.i.)=refnum then
41. begin
42. incache:=true;
43. goto quit;
44. end;
45. incache:=false; quit:
46. end;
47. Procedure readpage (refnum, pagenum, recnum:integer);
48. begin
49. (*read the disk page 'refnum' from disk
50. into location 'pagenum' of cache.
51. also set the value of numrecs (.numpage.) to the number of records in page
52. and set the value of reclength (.numpage, i.) to the
53. length of record i in page numpage, for i = 1 to numrecs(.numpage.)*)
54. cachecontents(.pagenum.):=refnum; (*update*)
55. numrecs(.pagenum.):=RECS; (*fixed for this test*)
56. for i:=1 to numrecs(.pagenum.) do
57. reclength(.pagenum, i.):=250; (*fixed for this test*)
58. for i:=1 to RECS do reclogaddr(.pagenum,i.)
59. :=0; (*clear record log addresses*)
60. end;
61. Procedure checkrefs (Var allon:boolean); Label done; (*check all reference bits
62. in cache. If all are on, set allon:=true else set allon:=false.
    *)
63. begin
64. for i:=1 to NPAG do if refbit(.i.)=0 then
65. begin
66. allon:=false;
67. goto done;
68. end;
69. allon:=true; done:
70. end;
71. Procedure changeover;
72. (*perform log changeover*)
```

APPENDIX-continued

```
73. begin
74. (*move currlogindex to next value in sequence 1,2,3,1*)
75. currlogindex:=currlogindex+1; if currlogindex=4 then currlogindex:=1;
76. currlogbytesfree:=L; (*new log so empty*)
77. for i:=1 to NPAG do refbit(.i.):=0; (*clear reference bits in cache*)
78. end;
79. Procedure logproc(pagenum,recnum:integer); (*"Procedure Y"*) (*write the NVB to
80. the log and manage the log changeovers. Pagenum,recnumdescribe location of
81. record in cache*)
82. Var
83. pagn,recn,i:integer; Label
    done;
84. Begin
85. reclogaddr(.pagenum,recnum.):=currlogindex; (*log which gets it*)
86. writerectonvb genum,recnum); (*write record t Nvb*)
87. if NVBbytesfree > M-1 then goto done;
88. writenvb; (*empty NVB to log*)
89. if (currlogbytesfree >= H) then goto done;
90. (*remaining case requires all remaining scanning to be done now so that
91. in preferred implementation, current log can hold all possible
92. records that must be written*)
93. if currlogbytesfree < 2*B then
94. begin
95. changeover; (*log changeover*)
96. goto done;
97. end;
98. (*remaining case- log not full, but all rewriting of stale records must
    be finished now*)
99. checkrefs(allon); (*are all ref bits in cache on? If so, then all scanning
    is already done*)
100. if allon then goto done;
101. (*final scan needed; determine test log address*)
102. testlogaddr:=currlogindex+1;
103. if testloagaddr=4 then testlogaddr:=1;
104. for pagn:=1 to NPAG do if refbit(.pagn.)=0 then
105. begin
106. (*scan recs in page*)
107. refbit(.pagn.):=1; (*mark as having been scanned*)
108. for recn:=1 to numrecs(.pagn.) do
109. begin
110. if reclogaddr(.pagn,recn.) = testlogaddr then
111. begin
112. if currlogbytesfree > 2*B then
113. begin
114. (*write to NVB*)
115. if NVBbytesfree < reclength(.pagn,recn.) then
116. writenvb; (*write NVB to log if free space low*)
117. writerectonvb(pagn,recn); (*write record to NVB*)
118. reclogaddr(.pagn,recn.):=currlogindex; (*update*)
119. end else
120. begin
121. (*log hasn't enough room so write changed records to
122. secondary storage locations*)
123. reclogaddr(.pagn,recn.):=0; (*clear bit since now data is safe*)
124. end;
125. end;
126. end; (*recn loop*)
127. end; (*pagn loop*)
128. if NVBbytesfree < B
129. then writenvb; (*write NVB to current log if nonempty*)
130. if currlogbytesfree < B then changeover;
131. done;
132. end; (*proc logproc*)
133. Procedure nvb (refnum,recnum,pagenum:integer: isread:boolean);
134. (*call each time a new reference is made
135. refnum is page number in secondary storage
136. recnum is record number within the page
137. pagenum is cache page it is stored into
138. isread is true if this is a read request, false if a write request
139. cache holds NPAG pages
140. each page is 512 bytes and can hold up to RECS records*) Var i:integer; Begin
141. checkcache(refnum,incache); (*is referenced page in cache?*)
142. if not incache then
143. begin
144. (*not in cache*)
145. readpage(refnum,pagenum,recnum); (*read page from disk that holds the
     record requested*)
146. reclogaddr(.pagenum,recnum.):=0; (*record not logged yet*)
147. refbit(.pagenum.):=1; (*reference bit on*)
148. end;
149. if refbit(.pagenum.)=0 then refflag:=false else refflag:=true;
150. if not isread then
```

APPENDIX-continued

```
151. begin
152.    (*request is to write, so write to journal*)
153.    logproc(pagenum,recnum); (*write to NVB*)
154.    end;
155. if not refflag then
156.    begin (*ref bit was not on for most recent ref*)
157.    (*scan for stale records in log*)
158.    testlogaddr:=currlogindex+1;
159.    if testlogaddr=4 then testlogaddr:=1;
160.    for i:=1 to numrecs(.pagenum.) do
161.      if testlogaddr = reclogaddr(.pagenum,i.) then
162.        logproc(pagenum,i); (*move forward stale record*)
163.    refbit(.pagenum.):=1; (*turn on ref bit when all such records moved*)
164.    end; end; (*procedure nvb*)
165. (*MAIN*) Begin writeln('Input file?'); readln(filename); assign(inp,filename);
166. reset(inp); writeln('Number of input references?'); readln(trials); for i:=1 to
167. NPAG do
168. begin
169.    (*initialize*)
170.    refbit(.i.):=0;
171.    numrecs(.i.):=0;
172.    cachecontents(.i.):=1; (*no pages in cache*)
173.    for j:=1 to RECS do
174.      reclogaddr(.i,j.):=0;
175.    end; currlogindex:=1; (*start with log 1*) NVBbytesfree:=B; (*initial free
176.    bytes in NVB*) currlogbytesfree:=L; (*free bytes in current log*)
177.    for j:=1 to trials do
178.    begin
179.    (*loop once for each reference processed*)
180.    genreq(refnum,recnum,cacheloc,isread);
181.    nvb(refnum,recnum,cacheloc,isread);
182.    end;
183. end.
```

What is claimed is:

1. In a data processing system having a host system, a controller attached to said host system, and a plurality of data storage devices connected to said controller, said controller including a cache, a nonvolatile storage, and a memory containing a status table, said controller comprising attaching means for said plurality of data storage devices, each of said data storage devices having a device status track having a device identification number and controller identification number recorded thereon, said status table in said memory comprising status information on said nonvolatile storage, said cache, a fast write condition indicating a delayed writing of data stored in said nonvolatile storage to one of said data storage devices when active, and a device identification number and a controller identification number of each of said data storage devices, a method of performing a fast write operation comprising the steps of:

accepting a write request from said host for writing data to one of said data storage devices;

checking said status table to determine if said nonvolatile storage is available, if said cache is active, and if said fast write condition is active;

if said nonvolatile storage is available, said cache is active and said fast write condition is active, then storing duplicate copies of said data in said nonvolatile storage and said cache;

signalling said host that a write operation completed successfully as soon as said duplicate copies of said data are successfully written to said nonvolatile storage and said cache; and writing said data stored in said nonvolatile storage to one of said data storage devices at a later time;

but if either said nonvolatile storage is unavailable or said fast write condition is inactive, then immediately destaging data stored in said cache to one of said data storage devices; and in the case where said cache is inactive, then immediately destaging data stored in said nonvolatile storage to one of said data storage devices.

2. The method of performing a fast write operation as recited in claim 1, further comprising the step of preventing an initial memory load of a data storage device from successfully completing unless said controller identification number and said device identification number in said status table of said controller match said device and controller identification numbers on said device status track of said data storage device.

3. The method of performing a fast write operation as recited in claim 1, wherein said data storage device has a standard format with a record zero and a predictable write operation is performed, comprising the steps of:

writing a track of information into said cache and said nonvolatile storage; and at a later time, orienting said data storage device to said record zero and destaging said track of information from said cache to said data storage device beginning at said record zero.

4. The method of performing a fast write operation as recited in claim 3, further comprising the step of responding to a power loss by destaging said track of information from said nonvolatile store to said data storage device after power is restored.

5. The method of performing a fast write operation as recited in claim 1 wherein said nonvolatile storage comprises a nonvolatile buffer and a circular journal recorded on a nonvolatile medium, said nonvolatile buffer having a capacity less than the capacity of said cache, said method further comprising the steps of:

periodically transferring records in said nonvolatile buffer onto a partition of said circular journal; and periodically transferring selected entries from one partition to another partition of said circular journal after records in said nonvolatile storage have been written to a data storage device, whereby the most recent copy of each changed record in said cache always appears in either said nonvolatile buffer or said circular journal.

6. The method of performing a fast write operation as recited in claim 5 wherein each record in cache includes a status field, further comprising the steps of:
  if a record in cache matches a corresponding record on a data storage device, setting said status field to zero; but
  if a record in cache has been changed but not yet written to a data storage device, setting said status field to a value which points to a location in said circular journal to which the record is to be written.

7. A data processing system for performing a fast write operation comprising:
  a host system containing a plurality of channels;
  a controller attached to at least one of said channels and comprising a cache, a nonvolatile storage, and a memory containing a status table;
  a plurality of data storage devices attached to said controller, each of said data storage devices comprising a plurality of tracks having a plurality of records recorded thereon and a device status track having a device identification number and a controller identification number recorded thereon;
  said status table storing status information on said nonvolatile storage, said cache, a fast write condition indicating a delayed writing of data stored in said nonvolatile storage to one of said data storage devices when active, and a device identification number and a controller identification number for each of said storage devices;
  means for accepting a write request from said host to write data to one of said data storage devices;
  means for checking said status table to determine if said nonvolatile storage is available, if said cache is active, and if said fast write condition is active;
  means responsive to said checking means for storing duplicate copies of said data in said nonvolatile storage and said cache when said nonvolatile storage is available, said cache is active and said fast write condition is active;
  means for signalling said host that a write operation completed successfully as soon as said duplicate copies of said data are written to said nonvolatile storage and said cache;
  means for writing said data stored in said nonvolatile storage on one of said data store devices at a later time;
  means responsive to said checking means when either said nonvolatile storage is unavailable or said fast write condition is inactive for immediately destaging data stored in said cache to one of said data storage devices; and
  means responsive to said checking means when said cache is inactive for immediately destaging data stored in said nonvolatile storage to one of said data storage devices.

8. The data processing system as recited in claim 7, further comprising means for assuring integrity of data storage devices after failures by comparing said device identification number in said status table with said device identification number and said controller identification number on said device status track of said data storage device and disabling operation of said data processing system if the device identification number and controller identification number do not match.

9. The data processing system as recited in claim 7 wherein said nonvolatile storage comprises a nonvolatile buffer and a circular journal recorded on a nonvolatile medium, said data processing system further comprising:
  means for periodically transferring data in said nonvolatile buffer onto a partition of said circular journal; and
  means for periodically transferring selected entries from one partition to another partition of said circular journal after records in said nonvolatile storage have been written on a data storage device.

10. In a staged storage system wherein at least one processor accesses a volatile primary store in which data are destaged to a secondary store under a Least Recently Used (LRU) replacement algorithm, and data changes are made in records that are written initially to the primary store and thereafter posted to the secondary store only upon destaging, and data is formatted into records and pages, a method for protecting the primary store contents comprising the steps of:
  (a) responsive to each processor access of the primary store for altering a record, writing a copy of each changed record including a status field and time stamp into a nonvolatile buffer concurrent with updating of an accessed record in the primary store, each changed record and its copy having its status field set to a same value;
  (b) periodically copying changed records with status fields and time stamps from the buffer onto a circular journal stored on a nonvolatile medium, the journal having finite storage space and being partitioned into k consecutively addressable equal-sized extents, the status field being indicative as to which of the k journal partitions the record belongs, and the time stamp showing an order in which entries were written; and
  (c) during an interval within which changed records are being written into the buffer for eventual copying onto a journal partition i, selecting records in the primary store that have not been destaged and whose status fields indicate their association with the next journal partition in sequence following i, and writing said selected records into journal partition i.

11. A method according to claim 10, wherein the journal is partitioned into k consecutively addressable equal-sized extents and data is formatted into pages and records, each record having a status field indicative of whether the record has had either no changes thereto or in which journal partition changes of the record were written and each page having a status field indicative of whether there may exist stale records within the page.

12. A method according to claim 11, wherein the status field of each page is used to control the selection and rewriting of changed records that are not stale and which still reside in the primary store.

13. A method according to claim 10, wherein during an interval within which changed records are being written to the journal and upon the buffer being filled, destaging additional records to the secondary store which would otherwise be destined to be written into the journal.

14. A method according to claim 13 wherein if L is the number of bytes in each journal partition, N is the number of bytes in the primary store, B is the number of bytes in the buffer, M is a maximum record size in bytes, and H is a threshold in bytes of an amount of journal partition determinative when to complete scanning of the primary store for selecting stale records, then (a) $H = 4B + N + 1$, (b) $L > N + H$, (c) $L > H + B$, $H \geq 3B$, $B > M$, and $N > B$.

15. A method according to claim 10, wherein each page includes a status field indicative of whether there may exist stale changed records within the page and further wherein the page status field is used to control scanning and selection of prospectively stale records in the volatile primary store for determining which corresponding records in the journal are not stale and should be rewritten.

* * * * *